(12) United States Patent
Hong et al.

(10) Patent No.: US 7,599,331 B2
(45) Date of Patent: Oct. 6, 2009

(54) APPARATUS AND METHOD FOR CONTROLLING DATA TRANSFER RATE ON REVERSE LINK IN MOBILE COMMUNICATION SYSTEM

(75) Inventors: Ki-Seob Hong, Suwon-si (KR); Sung-Kwon Jo, Suwon-si (KR); Yun-Seok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 11/982,810

(22) Filed: Nov. 5, 2007

(65) Prior Publication Data

US 2008/0107030 A1 May 8, 2008

(30) Foreign Application Priority Data

Nov. 3, 2006 (KR) ...................... 10-2006-0108123

(51) Int. Cl.
*H04W 4/00* (2009.01)
(52) U.S. Cl. ........................ 370/332; 370/328; 370/329; 370/338; 455/453; 455/422.1
(58) Field of Classification Search ................. 370/332, 370/328, 329, 338; 455/453, 422.1
See application file for complete search history.

(56) References Cited

U.S. PATENT DOCUMENTS

2006/0229025 A1* 10/2006 Gandhi et al. .................. 455/69

FOREIGN PATENT DOCUMENTS

KR 1020020006588 A 1/2002

* cited by examiner

*Primary Examiner*—Nghi H Ly (57) ABSTRACT

A mobile communication system is provided. A base station includes: a measuring unit for measuring loads of all mobile stations existing within a sector; a first computation unit for computing a sector load by using a Rise Over Thermal (ROT) of the sector; a second computation unit for computing an interference factor, which is a ratio of an interference load caused by an adjacent sector to a corresponding sector load, by using the load of each mobile station and the sector load; and a determining unit for predicting a sector load depending on variation of a reverse data transfer rate of a target mobile station by using the interference factor and for determining the reverse data transfer rate of the target mobile station in a range where the predicted sector load does not exceed a sector threshold load.

20 Claims, 6 Drawing Sheets

APPARATUS AND METHOD FOR CONTROLLING DATA TRANSFER RATE ON REVERSE LINK IN MOBILE COMMUNICATION SYSTEM

CROSS-REFERENCE TO RELATED APPLICATION(S) AND CLAIM OF PRIORITY

This application claims the benefit under 35 U.S.C. § 119(a) of Korean patent application filed in the Korean Intellectual Property Office on Nov. 3, 2007 and assigned Serial No. 2006-108123, the entire disclosure of which is hereby incorporated by reference.

TECHNICAL FIELD OF THE INVENTION

The present invention relates to an apparatus and method for controlling wireless resources in a mobile communication system. More particularly, the present invention relates to an apparatus and method for controlling a data transfer rate on a reverse link in a mobile communication system.

BACKGROUND OF THE INVENTION

Mobile communication systems employing a 2nd Generation (2G) Code Division Multiple Access (CDMA) scheme generally provide voice-based services over a relatively low-speed traffic channel on a forward and reverse link. Herein, the forward link is defined as a direction from a base station (BS) to a mobile station (MS), and the reverse link is defined as a direction from the mobile station to the base station. However, instead of the simple voice-based services, users now demand a variety of services. To satisfy such user demands, systems capable of providing data services have been developed, and a worldwide standard has been prepared. As described above, the mobile communication systems have recently evolved from voice-based systems to 3rd Generation (3G) systems which are designed to provide high-speed data services.

In the aforementioned mobile communication system, the mobile station and the base station occupy wireless channel resources to communicate with each other. Therefore, when all assignable wireless resources are currently in use, the base station can neither assign a new call nor increase a data transfer rate of an existing call. In other words, when the base station assigns a new call using more than the assignable amount of wireless resources or when the base station increases the data transfer rate of an existing call, not only the base station but also the mobile stations existing within a coverage of a neighboring base station are significantly affected. In addition, even if the call is not assigned or the data transfer rate is not increased, the amount of assignable wireless resources may change due to a fading effect or the like, thereby adversely affecting the system. Therefore, there is a need for a method for allowing a base station to accurately recognize an occupation state of wireless resources currently being used and for determining a desired data transfer rate.

In a technique for determining a data transfer rate on a reverse link, that is, determining a reverse link load, a total sector load is determined, a load caused by a mobile station which wants to determine a data transfer rate (hereinafter, such a mobile station (MS) will be referred to as a "target MS") is then subtracted from the sector load, and the data transfer rate of the target mobile station is then regulated in a range where the sector load does not exceed a threshold. The currently used technique for determining the reverse link load is classified into two methods according to a manner of determining the sector load.

The first method is a load-based method in which only a load associated with a self sector user is determined as a sector load. The second method is a Rise Over Thermal (ROT)-based method in which all interferences including not only a self sector but also an external sector are taken into account in the sector load. Now, a process of controlling a data transfer rate on a reverse link according to the two method of measuring loads will be described in detail with reference to the accompanying drawings.

Figure 1:
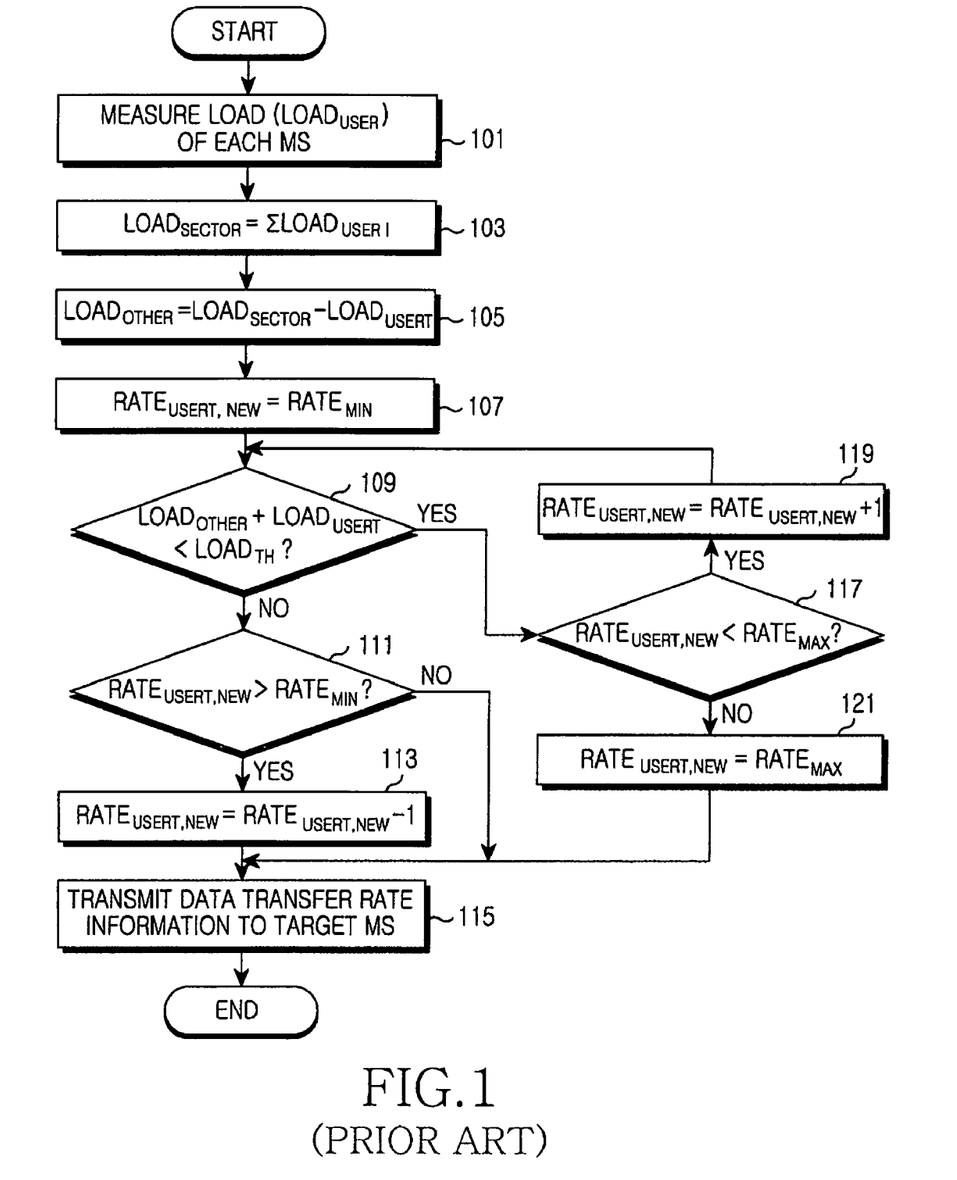
FIG. 1 is a flowchart illustrating a process in which a Base Station (BS) determines a data transfer rate on a reverse link by using a load-based method in a conventional mobile communication system.

FIG. 1 is a flowchart illustrating a process in which a base station (BS) determines a data transfer rate on a reverse link by using a load-based method in a conventional mobile communication system.

Referring to FIG. 1, the BS measures loads ($Load_{user}$) of all mobile stations (or users) in step 101. Herein, the load is defined as a ratio of a received power for a mobile station (MS) channel to a total received power in the BS. After measuring the loads of the MSs, the BS sums the loads ($Load_{user}$) of the MSs in step 103, and thus determines a sector load ($Load_{sector}$). Thereafter, in step 105, the BS subtracts the target MS load ($Load_{userT}$) from the sector load ($Load_{sector}$), and thus determines a reference load ($Load_{other}$). Then, in step 107, the BS determines a target MS's temporary data transfer rate ($Rate_{userT,new}$) to be a minimum data transfer rate ($Rate_{Min}$).

After determining the temporary data transfer rate, in step 109, the BS computes a temporary load ($Load_{userT,new}$) resulting from the target MS's temporary data transfer rate ($Rate_{userT,new}$), sums the temporary load ($Load_{userT,new}$) and the reference load ($Load_{other}$), and compares the summation value with a predetermined sector threshold load ($Load_{th}$).

If the comparison result shows that the summation value is greater than or equal to the predetermined sector threshold load, in step 111, the BS compares the temporary data transfer rate ($Rate_{userT,new}$) with the minimum data transfer rate ($Rate_{Min}$). If the temporary data transfer rate ($Rate_{userT,new}$) is greater than the minimum data transfer rate ($Rate_{Min}$), in step 113, the BS decreases the temporary data transfer rate ($Rate_{userT,new}$) by one level. On the other hand, if the minimum data transfer rate ($Rate_{Min}$) is greater than or equal to the temporary data transfer rate ($Rate_{userT,new}$), in step 115, the BS determines a target MS's data transfer rate to be the temporary data transfer rate ($Rate_{userT,new}$), and transmits data transfer rate information to the target MS.

If the comparison result of step 109 shows that the sector threshold load ($Load_{th}$) is greater than the summation value, in step 117, the BS compares a maximum data transfer rate ($Rate_{Max}$) with the temporary data transfer rate ($Rate_{userT,new}$). If the maximum data transfer rate ($Rate_{Max}$) is greater than the temporary data transfer rate ($Rate_{userT,new}$), in step 119, the BS increases the temporary data transfer rate ($Rate_{userT,new}$) by one level. Then, the procedure returns to step 109. On the other hand, if the temporary data transfer rate ($Rate_{userT,new}$) is greater than or equal to the maximum data transfer rate ($Rate_{Max}$), in step 121, the BS determines the temporary data transfer rate ($Rate_{userT,new}$) to be the maximum data transfer rate ($Rate_{Max}$).

In step 115, the BS determines the target MS's data transfer rate to be the temporary data transfer rate ($Rate_{userT,new}$), and transmits the data transfer rate information to the target MS.

Figure 2:
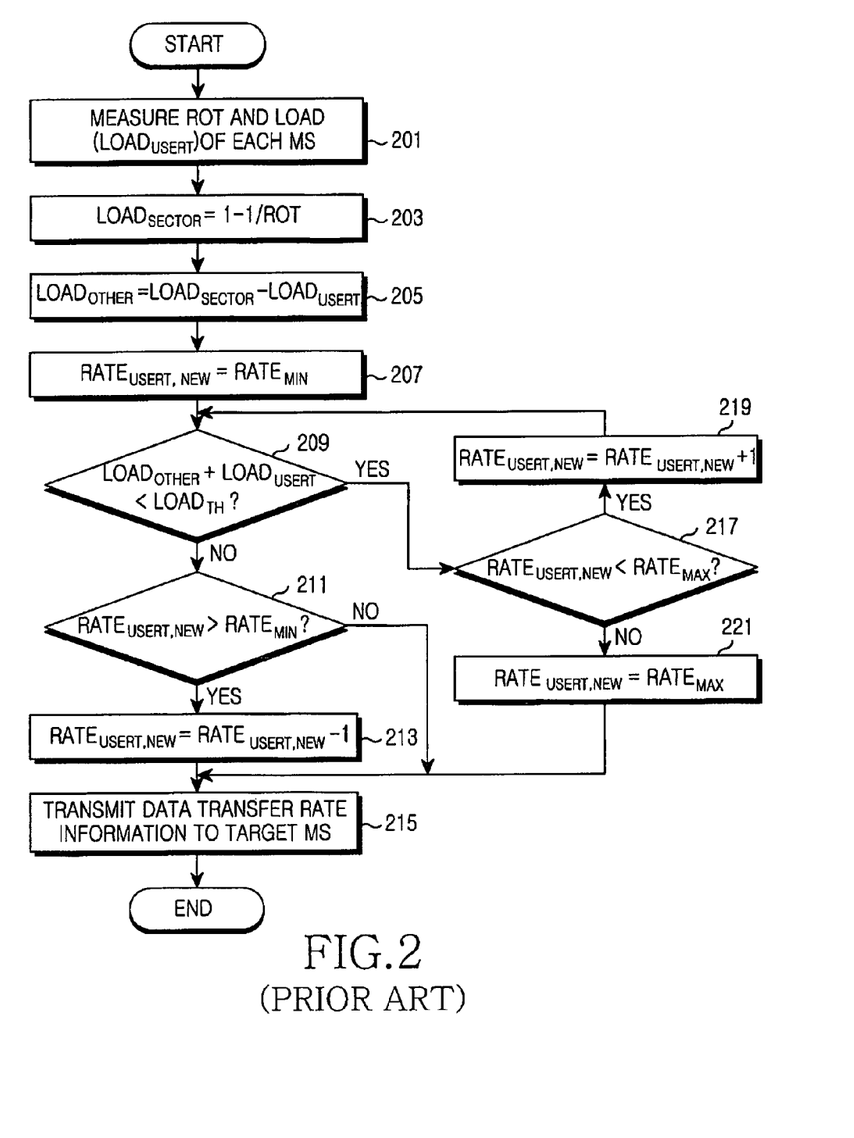
FIG. 2 is a flowchart illustrating a process in which a BS determines a data transfer rate on a reverse link by using a Rise Over Thermal (ROT)-based method in a conventional mobile communication system.

FIG. 2 is a flowchart illustrating a process in which a base station (BS) determines a data transfer rate on a reverse link by using an ROT-based method in a conventional mobile communication system.

Referring to FIG. 2, the BS measures an ROT and loads ($Load_{user}$) of all mobile stations in step 201. Herein, the load is defined as a ratio of a received power for a mobile station (MS) channel to a total received power in the BS.

After measuring the loads of the MSs, in step 203, the BS determines a sector load ($Load_{sector}$) by using the ROT. In step 205, the BS subtracts a target MS's load ($Load_{userT}$) from the sector load ($Load_{sector}$), and thus determines a reference load ($Load_{other}$). In step 207, the BS determines a target MS's temporary data transfer rate ($Rate_{userT,new}$) to be a minimum data transfer rate ($Rate_{Min}$).

After determining the temporary data transfer rate, in step 209, the BS computes a temporary load ($Load_{userT,new}$) resulting from the target MS's temporary data transfer rate ($Rate_{userT,new}$), sums the temporary load ($Load_{userT,new}$) and a reference load ($Load_{other}$), and compares the summation value with a predetermined sector threshold load ($Load_{th}$).

If the comparison result shows that the summation value is greater than or equal to the predetermined sector threshold load ($Load_{th}$), in step 211, the BS compares the temporary data transfer rate ($Rate_{userT,new}$) with the minimum data transfer rate ($Rate_{Min}$). If the temporary data transfer rate ($Rate_{userT,new}$) is greater than the minimum data transfer rate ($Rate_{Min}$), in step 213, the BS decreases the temporary data transfer rate ($Rate_{userT,new}$) by one level. On the other hand, if the minimum data transfer rate ($Rate_{Min}$) is greater than or equal to the temporary data transfer rate ($Rate_{userT,new}$), in step 215, the BS determines target MS's data transfer rate to be the temporary data transfer rate ($Rate_{userT,new}$), and transmits data transfer rate information to the target MS.

If the comparison result of step 209 shows that the sector threshold load ($Load_{th}$) is greater than the summation value, in step 217, the BS compares a maximum data transfer rate ($Rate_{Max}$) with the temporary data transfer rate ($Rate_{userT,new}$). If the maximum data transfer rate ($Rate_{Max}$) is greater than the temporary data transfer rate ($Rate_{userT,new}$), in step 219, the BS increases the temporary data transfer rate ($Rate_{userT,new}$) by one level. Then, the procedure returns to step 209. On the other hand, if the temporary data transfer rate ($Rate_{userT,new}$) is greater than or equal to the maximum data transfer rate ($Rate_{Max}$), in step 221, the BS determines the temporary data transfer rate ($Rate_{userT,new}$) to be the maximum data transfer rate ($Rate_{Max}$).

In step 215, the BS determines the target MS's data transfer rate to be the temporary data transfer rate ($Rate_{userT,new}$), and transmits the data transfer rate information to the target MS.

As described above, the data transfer rate on the reverse link can be determined in the mobile communication system by using the load-based or ROT-based method. However, when the load-based method is used, interference caused by an external sector cannot be measured. As a result, a significant discrepancy may occur between a predicted sector load and an actual sector load. Thus, there is a need to determine a threshold of the sector load conservatively. Although the interference caused by the external sector is taken into account in the ROT-based method, a discrepancy between the predicted sector load and the actual sector load still exists.

In other words, the aforementioned two methods do not consider a phenomenon in which, when a data transfer rate of an MS included in a self sector increases, interference to an adjacent sector increases due to the MS having the increased data transfer rate, and thus transmission power increases in the adjacent sector, thereby increasing interference to the self sector. Likewise, when the data transfer rate of the MS included in the self sector decreases, decrease of interference from the external sector is not considered. Therefore, there is a problem in that a Quality of Service (QoS) deteriorates and wireless resources are wasted when inaccurate prediction of a sector load on a reverse link adversely affects an external sector or disables the use of remaining wireless resources.

SUMMARY OF THE INVENTION

To address the above-discussed deficiencies of the prior art, it is a primary aspect of the present invention to address at least the above-mentioned problems and/or disadvantages and to provide at least the advantages described below. Accordingly, an aspect of the present invention is to provide an apparatus and method for reducing deterioration in a Quality of Service (QoS) and waste of wireless resources in a mobile communication system.

Another aspect of the present invention is to provide an apparatus and method for predicting a sector load on a reverse link by using an interference factor indicating interference caused by an external sector in a mobile communication system.

Another aspect of the present invention is to provide an apparatus and method for determining a data transfer rate on a reverse link on the basis of a sector load predicted by using an interference factor in a mobile communication system.

According to an aspect of the present invention, a base station (BS) apparatus in a mobile communication system is provided. The apparatus includes: a measuring unit for measuring loads of all mobile stations (MSs) existing within a sector; a first computation unit for computing a sector load by using a Rise Over Thermal (ROT) of the sector; a second computation unit for computing an interference factor, which is a ratio of an interference load caused by an adjacent sector to a corresponding sector load, by using the load of each mobile station and the sector load; and a determining unit for predicting a sector load depending on variation of a reverse data transfer rate of a target mobile station by using the interference factor and for determining the reverse data transfer rate of the target mobile station in a range where the predicted sector load does not exceed a sector threshold load.

According to another aspect of the present invention, a method of determining a reverse data transfer rate by a base station in a mobile communication system is provided. The method includes the steps of: computing a sector load by using an ROT and measuring average loads of mobile stations existing within a sector; computing an interference factor, which is a ratio of an interference load caused by an adjacent sector to a corresponding sector load, by using the average load of each mobile station and an averages sector load; predicting a sector load depending on variation of a reverse data transfer rate of a target mobile station by using the interference factor; and determining the reverse data transfer rate of the target mobile station in a range where the predicted sector load does not exceed a sector threshold load.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

A technique of the present invention will be described hereinafter in which a sector load is predicted by using an interference factor indicating interference caused by an adjacent sector, and a data transfer rate on a reverse link is determined according to the predicted sector load. In the present invention, a Code Division Multiple Access (CDMA)-based mobile communication system will be described for example.

Figure 3:
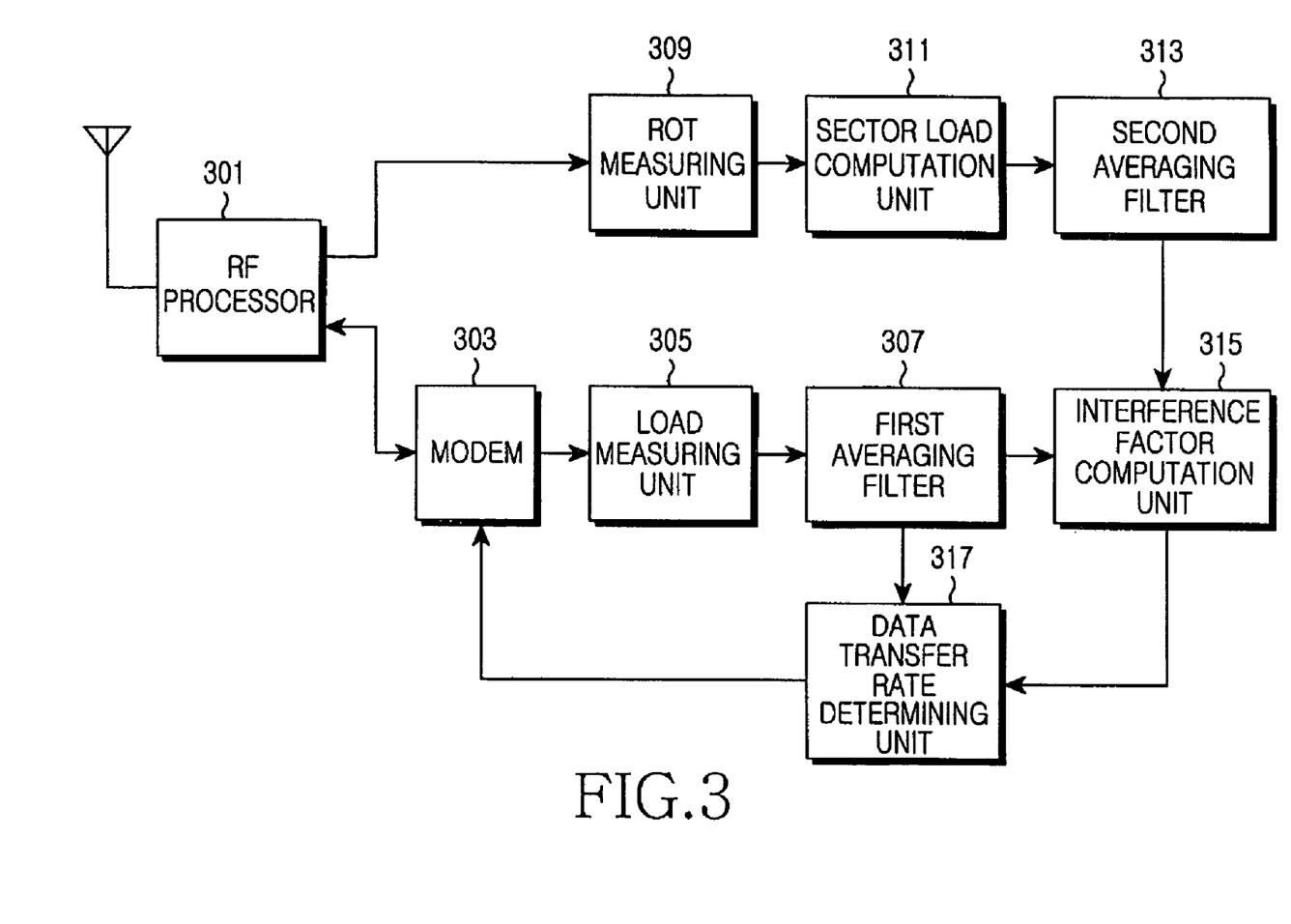
FIG. 3 is a block diagram illustrating a BS in a mobile communication system according to the present invention.

FIG. 3 is a block diagram illustrating a base station (BS) in a mobile communication system according to the present invention.

Referring to FIG. 3, the BS includes a radio frequency (RF) processor 301, a MOdulator-DEModulator (MODEM) 303, a load measuring unit 305, a first averaging filter 307, a Rise Over Thermal (ROT) measuring unit 309, a sector load computation unit 311, a second averaging filter 313, an interference factor computation unit 315, and a data transfer rate determining unit 317.

The RF processor 301 converts an RF signal received through an antenna into a baseband signal or vice versa. That is, the baseband signal received from the MODEM 303 is converted into the RF signal and is then transmitted through the antenna. Further, the RF signal received through the antenna is converted into the baseband signal and is then output to the MODEM 303.

The MODEM 303 processes a baseband digital signal. In other words, when data is transmitted, the data is subject to channel encoding and modulation, and the resultant modulated signal is subject to channel spreading (i.e., Walsh spreading) and pseudo-noise (PN) spreading.

In addition, when data is received, the baseband signal received from the RF processor 301 is subject to PN de-spreading and channel de-spreading, and the resultant de-spread signal is subject to demodulation and decoding. Further, when the data is received, the MODEM 303 restores a pilot channel of a signal received from the RF processor 301 and measures a received power (e.g., signal-to-noise ratio (SNR)) for the pilot channel.

The load measuring unit 305 measures loads of all mobile stations (MSs or users) by using the measured value of the received power with respect to the pilot channel provided from the MODEM 303. The load of each MS is defined as a ratio of a received power for a channel occupied by a corresponding MS to a total received power of a BS. That is, the load measuring unit 305 evaluates power of a signal received through a channel occupied by each MS and computes, for each MS, a ratio of the measured power to the total receiver power (i.e., a received power for a channel of an MS/ a total received power).

The first averaging filter 307 receives load information of each MS from the load measuring unit 305 and thus computes an average load of each MS. The average load is computed according to Equation (1) below.

$$AvgInLoad(n) = \left(1 - \frac{1}{T_{AvgInLoad}}\right) \cdot$$
$$AvgInLoad(n-1) + \frac{1}{T_{AvgInLoad}} \cdot InLoad(n)$$
(1)

In Equation (1), AvgInLoad(x) denotes an $x^{th}$ computed average load of an MS, $T_{AvgInLoad}$ denotes a predetermined time constant, and InLoad(x) denotes an $x^{th}$ provided load of the MS, measured by the load measuring unit 305.

The ROT measuring unit 309 measures a total received power and a thermal noise power by using a signal provided from the RF processor 301, and computes the ROT according to Equation (2) below by using the measurement result.

$$ROT_{dB} = TotalReceivedPower_{dB} - ThermalNoisePower_{dB} \quad (2)$$

In Equation (2), TotalReceivedPower$_{dB}$ denotes a total receive power expressed in the unit of dB, and ThermalNoisePower$_{dB}$ denotes a thermal noise power expressed in the unit of dB.

In Equation (2), TotalReceivedPower$_{dB}$ denotes a total receive power expressed in the unit of dB, and ThermalNoisePower$_{dB}$ denotes a thermal noise power expressed in the unit of dB.

$$TotLoad = 1 - \frac{1}{ROT} \quad (3)$$

In Equation (3), TotLoad denotes a sector load, and ROT denotes an ROT value computed by the ROT measuring unit 309.

The second averaging filter 313 receives information on the sector load (TotLoad) from the sector load computation unit 311 and thus computes an average sector load (AvgTotLoad). The average sector load (AvgTotLoad) is computed according to Equation (4) below.

$$AvgTotLoad(n) = \left(1 - \frac{1}{T_{AvgTotLoad}}\right) \cdot \\ AvgTotLoad(n-1) + \\ \frac{1}{T_{AvgTotLoad}} \cdot TotLoad(n)$$ (4)

In Equation (4), AvgTotLoad(x) denotes an $x^{th}$ computed average load of an MS, $T_{AvgTotLoad}$ denotes a predetermined time constant, and TotLoad(x) denotes an $x^{th}$ provided load of the MS, obtained from the sector load computation unit 311.

The interference factor computation unit 315 receives information on an average load (AvgInLoad) of each MS and an average sector load (AvgTotLoad) from the first averaging filter 307 and the second averaging filter 313 and thus computes an interference factor (InterferenceFactor) for indicating interference caused by an adjacent sector. The interference factor is defined as a ratio of an interference load to a self sector load (AvgLoad$_{sector}$) which is a total sum of average loads (AvgInLoad$_{user}$). The interference load is a difference between the average sector load (AvgTotLoad) and the self sector load (AvgInLoad$_{sector}$). An operation of computing the interference factor will be described below with reference to FIG. 5.

The data transfer rate determining unit 317 receives information on the average load (AvgInLoad) of each MS and the interference factor (InterferenceFactor) from the interference factor computation unit 315 and thus determines a reverse data transfer rate (Rate$_{userT}$) of a specific MS. Hereinafter, for convenience of descriptions, the specific MS whose reverse data transfer rate needs to be determined will be referred to as a target MS. According to a method of determining an initial value of the reverse data transfer rate, the reverse data transfer rate is determined in various manners, and details thereof will be described below with reference to FIG. 4 and FIG. 6. Information on the determined data transfer rate of the target MS is transmitted to the target MS.

Figure 4:
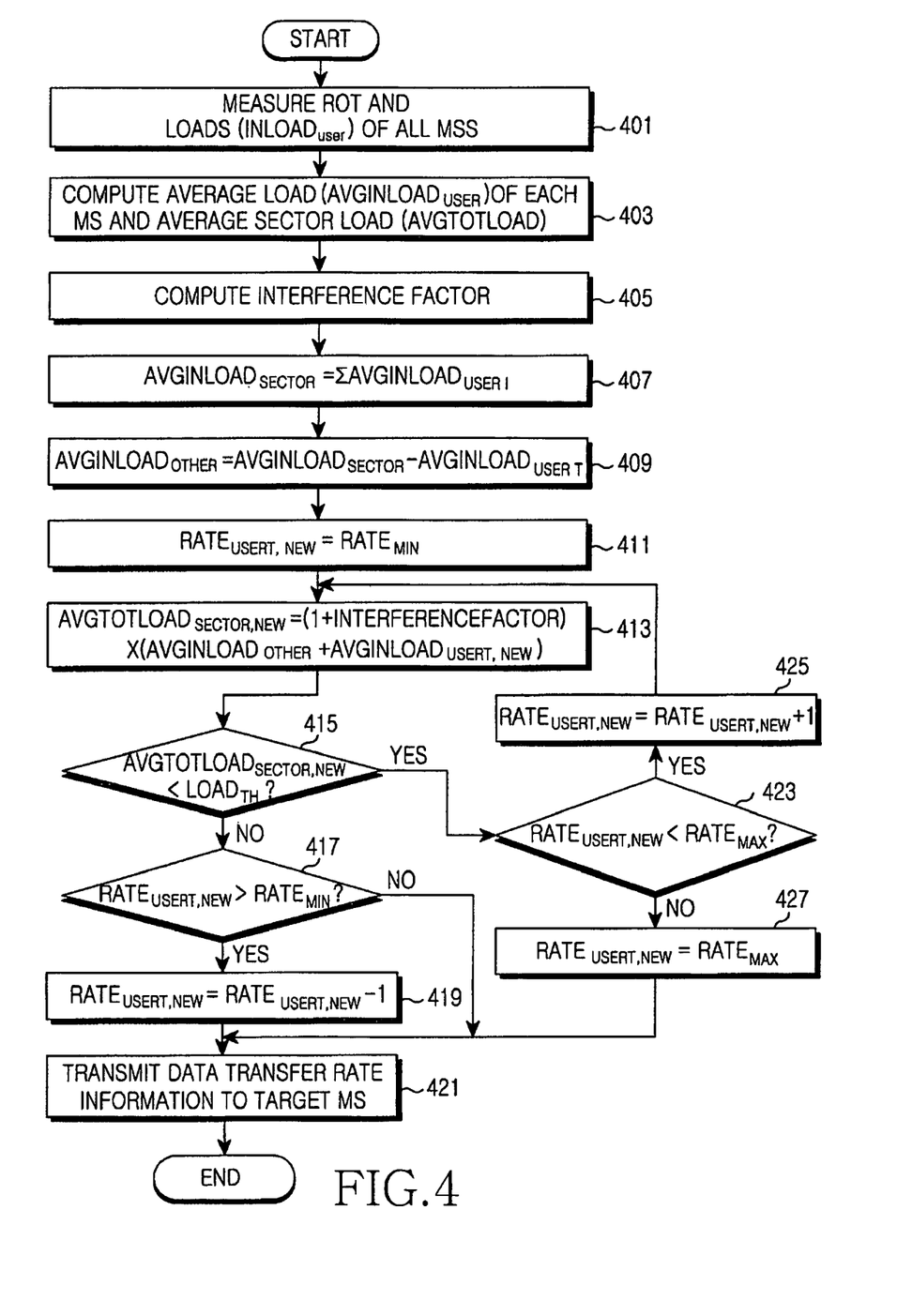
FIG. 4 is a flowchart illustrating a process in which a BS determines a data transfer rate on a reverse link in a mobile communication system according to an embodiment of the present invention.

FIG. 4 is a flowchart illustrating a process in which a BS determines a data transfer rate on a reverse link in a mobile communication system according to an embodiment of the present invention. In particular, the process of FIG. 4 shows an example for effectively determining the data transfer rate of an MS.

Referring to FIG. 4, the BS measures an ROT and loads (InLoad$_{user}$) of all MSs in step 401. The ROT is computed according to Equation (2) above.

In step 403, the BS computes an average load (AvgInLoad$_{user}$) of each MS and an average sector load (AvgTotLoad). The average load (AvgInLoad$_{user}$) of each MS is computed according to Equation (1) above by using a load (InLoad$_{user}$) of each MS. The average sector load (AvgTotLoad) is computed according to Equation (4) by using the ROT.

After computing the average load (AvgInLoad$_{user}$) of each MS and the average sector load (AvgTotLoad), the BS computes an interference factor (InterferenceFactor) in step 405. An operation of computing the interference factor (InterferenceFactor) will be described below in detail with reference to FIG. 5.

In step 407, the BS sums the average loads (AvgInLoad$_{user}$) of the respective MSs and thus computes a self sector load (AvgInLoad$_{sector}$).

After determining the self sector load (AvgInLoad$_{sector}$), in step 409, the BS computes a reference average load (AvgInLoad$_{other}$) by subtracting a target MS's average load (AvgInLoad$_{userT}$) from the self sector load (AvgInLoad$_{sector}$).

In step 411, the BS determines a target MS's temporary data transfer rate (Rate$_{userT,new}$) to be a minimum data transfer rate (Rate$_{Min}$).

After determining the temporary data transfer rate (Rate$_{userT,new}$), in step 413, the BS computes a temporary average load (AvgInLoad$_{userT,new}$) with respect to the temporary data transfer rate (Rate$_{userT,new}$), sums the temporary average load (AvgInLoad$_{userT,new}$) and the reference average load (AvgInLoad$_{other}$), and multiplies the summation result by the sum between the interference factor (InterferenceFactor) and 1, thereby obtaining a temporary average sector load (AvgTotLoad$_{sector,new}$).

After computing the temporary average sector load (AvgTotLoad$_{sector,new}$), in step 415, the BS compares the temporary average sector load (AvgTotLoad$_{sector,new}$) with a predetermined sector threshold load (Load$_{th}$).

If the temporary average sector load (AvgTotLoad$_{sector,new}$) is greater than or equal to the predetermined sector threshold load (Load$_{th}$), in step 417, the BS compares the target MS's temporary data transfer rate (Rate$_{userT,new}$) with the minimum data transfer rate (Rate$_{Min}$).

If the temporary data transfer rate (Rate$_{userT,new}$) is greater than the minimum data transfer rate (Rate$_{Min}$), in step 419, the BS decreases the target MS's temporary data transfer rate (Rate$_{userT,new}$) by one level.

On the other hand, if the minimum data transfer rate (Rate$_{Min}$) is greater than or equal to the temporary data transfer rate (Rate$_{userT,new}$), in step 421, the BS determines a target MS's data transfer rate to be the temporary data transfer rate (Rate$_{userT,new}$), and transmits data transfer rate information to the target MS.

If the comparison result of step 415 shows that the sector threshold load (Load$_{th}$) is greater than the temporary average sector load (AvgTotLoad$_{sector,new}$), in step 423, the BS compares the target MS's temporary data transfer rate (Rate$_{userT,new}$) with a maximum data transfer rate (Rate$_{Max}$).

If the maximum data transfer rate (Rate$_{Max}$) is greater than the temporary data transfer rate (Rate$_{userT,new}$), in step 425, the BS increases the target MS's temporary data transfer rate (Rate$_{userT,new}$) by one level. Then, the procedure returns to step 413.

On the other hand, if the temporary data transfer rate (Rate$_{userT,new}$) is greater than or equal to the maximum data transfer rate (Rate$_{Max}$), in step 427, the BS determines the target MS's temporary data transfer rate (Rate$_{userT,new}$) to be the maximum data transfer rate (Rate$_{Max}$).

In step 421, the BS determines the target MS's data transfer rate to be the temporary data transfer rate (Rate$_{userT,new}$), and transmits the data transfer rate information to the target MS.

Figure 5:
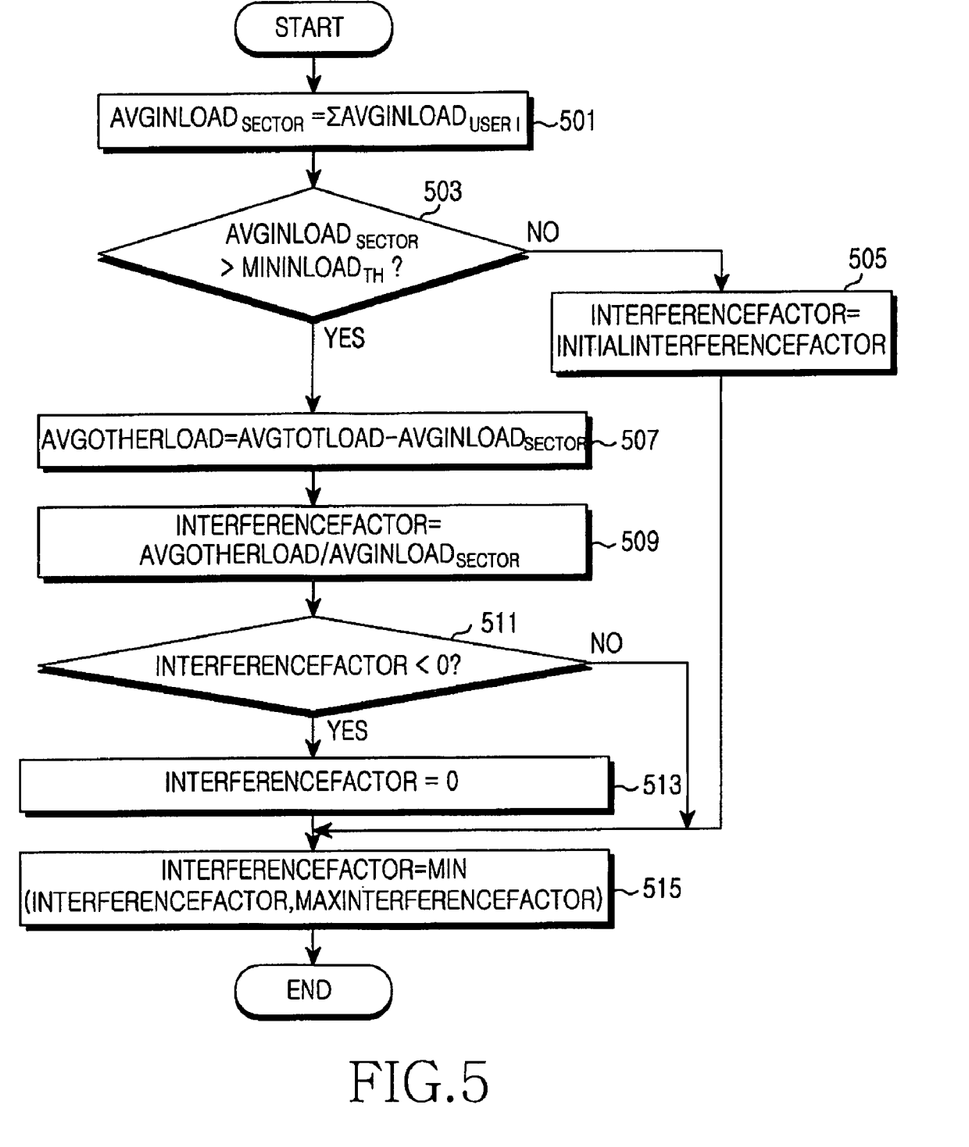
FIG. 5 is a flowchart illustrating a process in which a BS determines an interference factor in a mobile communication system according to an embodiment of the present invention.

FIG. 5 is a flowchart illustrating a process in which a BS determines an interference factor in a mobile communication system according to an embodiment of the present invention.

Referring to FIG. 5, in step 501, the BS sums average loads (AvgInLoad$_{user}$) of all MSs and thus computes an average self sector load (AvgInLoad$_{sector}$).

After computing the average self sector load (AvgInLoad$_{sector}$), in step 503, the BS compares the average self sector load (AvgInLoad$_{sector}$) with a self sector minimum threshold load (MinInLoad$_{th}$).

If the self sector minimum threshold load (MinInLoad$_{th}$) is greater than or equal to the average self sector load (AvgInLoad$_{sector}$), in step 505, the BS determines an interference factor (InterferenceFactor) to be a predetermined initial value (InitialInterferenceFactor). Then, the procedures proceeds to step 515.

On the other hand, if the average self sector load (AvgInLoad$_{sector}$) is greater than the self sector minimum threshold load (MinInLoad$_{th}$), in step 507, the BS subtracts the average self sector load (AvgInLoad$_{sector}$) from an average sector load (AvgTotLoad), and thus computes a sector interference load (AvgOtherLoad).

After computing the sector interference load (AvgOtherLoad), in step 509, the BS determines the interference factor (InterferenceFactor) to be a ratio of the sector interference load (AvgOtherLoad) to the average self sector load (AvgInLoadsector).

After determining the interference factor (InterferenceFactor), in step 511, the BS checks whether the interference factor (InterferenceFactor) is a negative value.

If the interference factor (InterferenceFactor) is the negative value, in step 513, the BS determines the interference factor (InterferenceFactor) to be zero, and then the procedure proceeds to step 515.

Otherwise, in step 515, the BS finally determines the interference factor (InterferenceFactor) to be a smaller value between a maximum interference factor (MaxInterferenceFactor) and the determined interference factor (InterferenceFactor).

Figure 6:
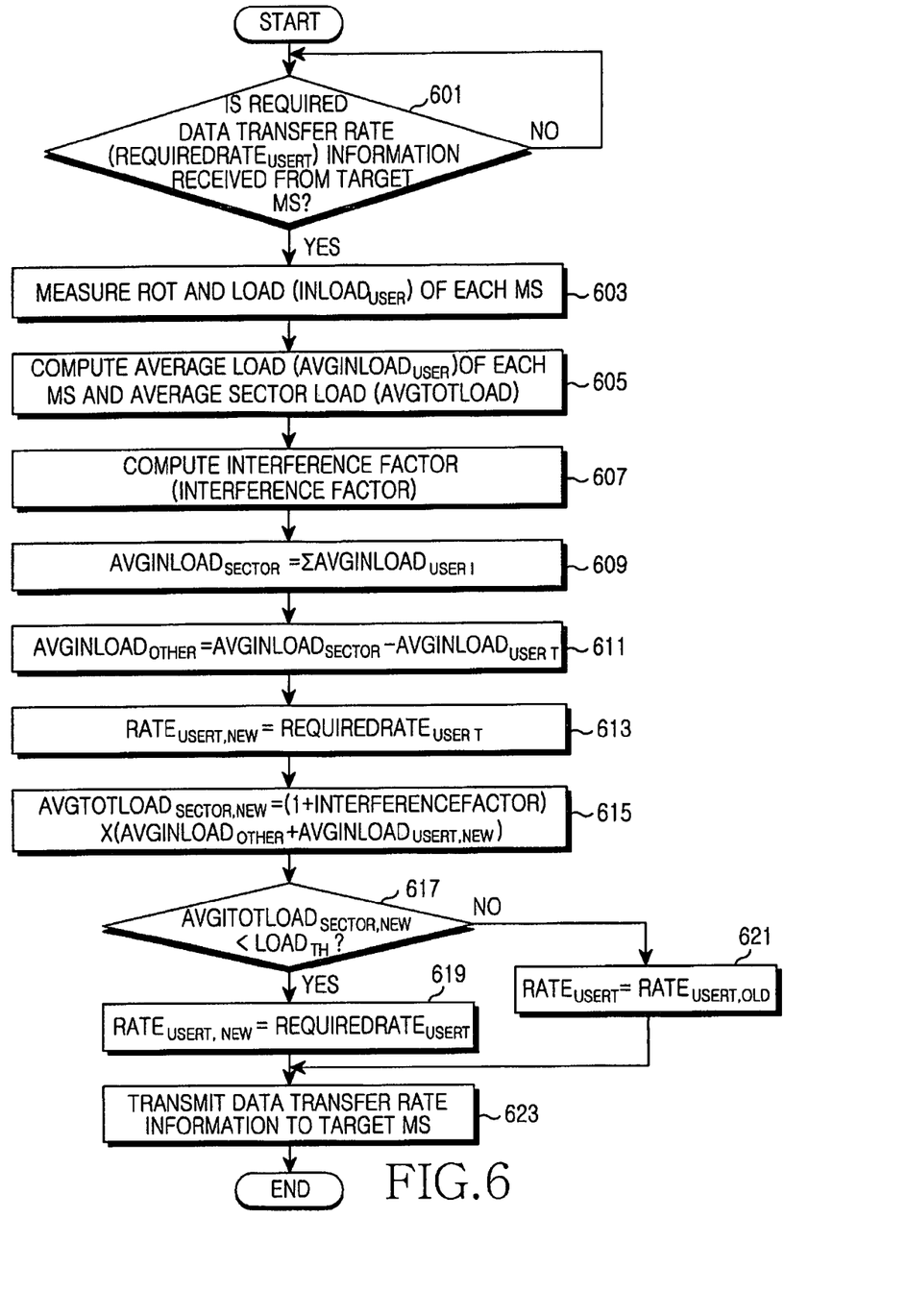
FIG. 6 is a flowchart illustrating a process in which a BS determines a data transfer rate on a reverse link in a mobile communication system according to another embodiment of the present invention.

FIG. 6 is a flowchart illustrating a process in which a BS determines a data transfer rate on a reverse link in a mobile communication system according to another embodiment of the present invention. The process of FIG. 6 shows an example for effectively determining whether a data transfer rate requested by an MS on a reverse link is allowed or not.

Referring to FIG. 6, the BS checks whether required data transfer rate (RequiredRate$_{usrT}$) information is received from an MS in step 601. In this case, by transmitting the required data transfer rate (RequiredRate$_{usrT}$) information, the MS is selected as a target MS.

In step 603, the BS measures an ROT and loads (InLoad$_{user}$) of all MSs. The ROT is computed according to Equation (2) above.

In step 605, the BS computes an average load (AvgInLoad$_{user}$) of each MS and an average sector load (AvgTotLoad). The average load (AvgInLoad$_{user}$) of each MS is computed by using the loads (InLoad$_{user}$) of the MSs as expressed by Equation (1) above. The average sector load (AvgTotLoad) is computed by using the ROT as expressed by Equation (4) above.

After computing the average load (AvgInLoad$_{user}$) of each MS and the average sector load (AvgTotLoad), in step 607, the BS computes an interference factor (InterferenceFactor). The operation of computing the interference factor (InterferenceFactor) has been described above in detail with reference to FIG. 5.

In step 609, the BS sums the average loads (AvgInLoad$_{user}$) of the respective MSs, and thus computes a self sector load (AvgInLoad$_{sector}$).

After computing the self sector load (AvgInLoad$_{sector}$) in step 611, the BS subtracts a target MS's average load (AvgInLoad$_{userT}$) from the self sector load (AvgInLoad$_{sector}$), and thus computes a reference average load (AvgInLoad$_{other}$).

In step 613, the BS determines a target MS's temporary data transfer rate (Rate$_{userT,new}$) as a required data transfer rate (RequiredRate$_{useT}$) requested by the target MS.

After determining the temporary data transfer rate (Rate$_{userT,new}$), in step 615, the BS computes a temporary average load (AvgInLoad$_{userT,new}$) for the temporary data transfer rate (Rate$_{userT,new}$), sums the temporary average load (AvgInLoad$_{userT,new}$) and the reference average load (AvgInLoad$_{other}$), and multiplies the summation value by the sum between the interference factor (InterferenceFactor) and 1, thereby computing a temporary average sector load (AvgTotLoad$_{sector,new}$).

After computing the temporary average sector load (AvgTotLoad$_{sector,new}$), in step 617, the BS compares the temporary average load (AvgTotLoad$_{sector,new}$) with a predetermined sector threshold load (Load$_{th}$).

If the sector threshold load (Load$_{th}$) is greater than the temporary average load (AvgTotLoad$_{sector,new}$), in step 619, the BS determines a target MS's data transfer rate (Rate$_{userT}$) to be the target MS's required data transfer rate (Required Rate$_{useT}$).

On the other hand, it the temporary average load (AvgTotLoad$_{sector,new}$) is greater than or equal to the sector threshold load (Load$_{th}$), in step 621, the BS determines the target MS's data transfer rate (Rate$_{userT}$) to be a previous data transfer rate (Rate$_{userT,old}$) used before the target MS performs this step.

After determining the target MS's data transfer rate (Rate$_{userT}$), in step 623, the BS transmits the determined data transfer rate (Rate$_{userT}$) to the target MS.

According to the present invention, a sector load is predicted in consideration of interference of an adjacent sector, and a reverse data transfer rate is controlled by using the predicted sector load. Therefore, wireless resources can be effectively used.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station apparatus in a mobile communication system, the apparatus comprising:
   a measuring unit for measuring loads of all mobile stations existing within a sector;
   a first computation unit for computing a sector load by using a Rise Over Thermal (ROT) of the sector;
   a second computation unit for computing an interference factor, which is a ratio of an interference load caused by an adjacent sector to a corresponding sector load, by using the load of each mobile station and the sector load; and
   a determining unit for predicting a sector load depending on variation of a reverse data transfer rate of a target mobile station by using the interference factor and for determining the reverse data transfer rate of the target mobile station in a range where the predicted sector load does not exceed a sector threshold load.

2. The apparatus of claim 1, wherein the first computation unit computes the sector load by using Equation $$TotLoad = 1 - \frac{1}{ROT},$$

where TotLoad denotes a sector load, and ROT denotes an ROT value of the sector.

3. The apparatus of claim 1, further comprising:
   a first averaging filter for averaging the loads of the respective mobile stations, measured by the measuring unit, and for providing the obtained average loads of the respective mobile stations to the second computation unit; and a second averaging filter for averaging sector loads measured by the first computation unit and for providing the obtained average sector load to the second computation unit.

4. The apparatus of claim 3, wherein the first and second averaging filters perform an averaging operation by using Equation $$AvgResult(n) = \left(1 - \frac{1}{T_{Avg}}\right) \cdot AvgResult(n-1) + \frac{1}{T_{Avg}} \cdot \text{Input}(n),$$

where AvgResult(x) denotes a value resulting from an xth averaging operation, and TAvg denotes an averaging time constant, and Input(x) denotes an xth input value.

5. The apparatus of claim 3, wherein the second computation unit computes a total sum of average loads of the respective mobile stations, obtained from the first averaging filter, then computes an interference load by subtracting the total sum of the average loads of the respective mobile stations from the average sector load obtained from the second averaging filter, and then determines the interference factor by dividing the interference load by the average loads of the respective mobile stations.

6. The apparatus of claim 5, wherein, if a value obtained by subtracting the total sum of the average loads of the respective mobile stations from the average sector load is a negative value, the second computation unit determines the interference factor to be zero.

7. The apparatus of claim 5, wherein, if the interference factor exceeds a predetermined maximum value, the second computation unit determines the interference factor to be the maximum value.

8. The apparatus of claim 5, wherein, if the total sum of the average loads of the respective mobile stations is less than or equal to a sector load minimum threshold, the second computation unit determines the interference factor to be a predetermined value.

9. The apparatus of claim 1, wherein the determining unit initializes a data transfer rate of the target mobile station to be a minimum data transfer rate, predicts the sector load while continuously increasing the data transfer rate by one level, and determines the reverse data transfer rate of the target mobile station to be a maximum data transfer rate in a range where the predicted sector load does not exceed a predetermined sector threshold load.

10. The apparatus of claim 1, wherein the determining unit predicts the sector load under the assumption that a data transfer rate requested by the target mobile station is equivalent to the data transfer rate of the target mobile station, and if the predicted sector load does not exceed a predetermined sector threshold load, determines the requested data transfer rate as the reverse data transfer rate of the target mobile station.

11. A method of determining a reverse data transfer rate by a base station in a mobile communication system, the method comprising the steps of:

computing a sector load by using a Rise Over Thermal (ROT) and measuring average loads of mobile stations existing within a sector;

computing an interference factor, which is a ratio of an interference load caused by an adjacent sector to a corresponding sector load, by using the average load of each mobile station and an averages sector load;

predicting a sector load depending on variation of a reverse data transfer rate of a target mobile station by using the interference factor; and determining the reverse data transfer rate of the target mobile station in a range where the predicted sector load does not exceed a sector threshold load.

12. The method of claim 11, wherein the sector load is computed according to Equation $$TotLoad = 1 - \frac{1}{ROT},$$

where TotLoad denotes a sector load, and ROT denotes an ROT value of the sector.

13. The method of claim 11, further comprising:
computing average loads of the respective mobile stations by averaging the loads of the mobile stations; and
computing an average sector load by averaging the sector loads.

14. The method of claim 13, wherein the averaging is performed by using Equation $$AvgResult(n) = \left(1 - \frac{1}{T_{Avg}}\right) \cdot AvgResult(n-1) + \frac{1}{T_{Avg}} \cdot \text{Input}(n),$$

where AvgResult(x) denotes a value resulting from an xth averaging operation, and TAvg denotes an averaging time constant, and Input(x) denotes an xth input value.

15. The method of claim 13, wherein the computing of the interference factor comprises:
computing a total sum of average loads of the respective mobile stations, obtained from the first averaging filter;
computing an interference load by subtracting the total sum of the average loads of the respective mobile stations from the average sector load obtained from the second averaging filter; and
determining the interference factor by dividing the interference load by the average loads of the respective mobile stations.

16. The method of claim 15, further comprising, if a value obtained by subtracting the total sum of the average loads of the respective mobile stations from the average sector load is a negative value, determining the interference factor to be zero.

17. The method of claim 15, further comprising, if the interference factor exceeds a predetermined maximum value, determining the interference factor to be the maximum value.

18. The method of claim 15, further comprising, if the total sum of the average loads of the respective mobile stations is less than or equal to a sector load minimum threshold, determining the interference factor to be a predetermined value.

19. The method of claim 11, wherein the determining of the data transfer rate comprises:
initializing a data transfer rate of the target mobile station to be a minimum data transfer rate;
predicting the sector load while continuously increasing the data transfer rate by one level; and
determining the reverse data transfer rate of the target mobile station to be a maximum data transfer rate in a range where the predicted sector load does not exceed a predetermined sector threshold load.

20. The method of claim 11, wherein the determining of the data transfer rate comprises:
predicting the sector load under the assumption that a data transfer rate requested by the target mobile station is equivalent to the data transfer rate of the target mobile station; and
if the predicted sector load does not exceed a predetermined sector threshold load, determining the requested data transfer rate as the reverse data transfer rate of the target mobile station.

* * * * *